United States Patent
Kinoshita et al.

(10) Patent No.: US 11,865,728 B2
(45) Date of Patent: Jan. 9, 2024

(54) FITTING METHOD AND ROBOT SYSTEM

(71) Applicant: Seiko Epson Corporation, Tokyo (JP)

(72) Inventors: Hirofumi Kinoshita, Matsumoto (JP); Kaoru Takeuchi, Azumino (JP); Hiroki Adachi, Yokohama (JP)

(73) Assignee: SEIKO EPSON CORPORATION

( * ) Notice: Subject to any disclaimer, the term of this patent is extended or adjusted under 35 U.S.C. 154(b) by 250 days.

(21) Appl. No.: 17/514,064

(22) Filed: Oct. 29, 2021

(65) Prior Publication Data
US 2022/0134563 A1    May 5, 2022

(30) Foreign Application Priority Data
Oct. 30, 2020    (JP) .................... 2020-182096

(51) Int. Cl.
*B25J 9/16*    (2006.01)
*B25J 13/08*    (2006.01)

(52) U.S. Cl.
CPC .......... *B25J 9/1687* (2013.01); *B25J 13/085* (2013.01); *B25J 13/088* (2013.01)

(58) Field of Classification Search
CPC ...... B25J 9/1687; B25J 13/085; B25J 13/088; B25J 9/1602; B25J 9/1633; B25J 19/023; G05B 2219/40032
See application file for complete search history.

(56) References Cited

U.S. PATENT DOCUMENTS

| | | | |
|---|---|---|---|
| 2002/0056181 A1* | 5/2002 | Sakakibara | B25J 9/1633 29/714 |
| 2014/0277720 A1* | 9/2014 | Izumi | B25J 9/1687 700/253 |
| 2015/0165620 A1* | 6/2015 | Osaka | B25J 13/088 700/250 |
| 2016/0052135 A1* | 2/2016 | Motoyoshi | B25J 9/1633 29/281.6 |
| 2017/0312921 A1* | 11/2017 | Kobayashi | B25J 9/1687 |
| 2018/0043540 A1* | 2/2018 | Satou | B25J 9/1633 |
| 2019/0047155 A1* | 2/2019 | Okuyama | B25J 13/085 |

FOREIGN PATENT DOCUMENTS

JP    2008-108630 A    5/2008

* cited by examiner

*Primary Examiner* — Adam R Mott
*Assistant Examiner* — Sagar Kc
(74) *Attorney, Agent, or Firm* — Harness, Dickey & Pierce, P.L.C.

(57) ABSTRACT

A fitting method includes (a) detecting a first position as a position where fitting of a first object and a second object is determined, (b) moving the first object from the first position toward a determination direction different from a fitting direction and detecting a second position as a position where magnitude of a force applied to the first object reaches a predetermined reference value, and (c) determining that a fitting condition of the first object and the second object is good when a predetermined determination condition including a condition that the second position is within an acceptable position range set according to the first position is satisfied.

6 Claims, 11 Drawing Sheets

FITTING METHOD AND ROBOT SYSTEM

The present application is based on, and claims priority from JP Application Serial Number 2020-182096, filed Oct. 30, 2020, the disclosure of which is hereby incorporated by reference herein in its entirety.

BACKGROUND

1. Technical Field

The present disclosure relates to a fitting method of fitting a first object in a second object using a robot and a robot system.

2. Related Art

JP-A-2008-108630 discloses a fitting check method of performing fitting work of two objects using a robot and checking whether or not the objects are properly fitted after the work. The objects for fitting are a female connector and a male connector. In the related art, after fitting of the two connectors, the connectors are pulled in release directions with a pulling force smaller than a force that can release the fitting, and whether or not a fitting condition is good is determined according to the pulling force.

However, in the related art, whether or not the fitting condition is good is determined according to the force for moving the objects in the release directions, and there is a problem that fitting in which the objects are firmly fixed, which should be determined as being not good, may be falsely determined as being good.

SUMMARY

According to a first aspect of the present disclosure, a fitting method of fitting a first object in a second object using a robot having a movable unit including a robot arm and an end effector provided in the robot arm and gripping the first object and a force detection unit detecting a force applied to the movable unit is provided. The fitting method includes (a) moving the first object in a fitting direction and detecting a first position as a position where fitting of the first object and the second object is determined, (b) moving the first object from the first position toward a determination direction different from the fitting direction and detecting a second position as a position where magnitude of a force applied to the first object reaches a predetermined reference value, and (c) determining that a fitting condition of the first object and the second object is good when a predetermined determination condition including a condition that the second position is within an acceptable position range set according to the first position is satisfied.

According to a second aspect of the present disclosure, a robot system that fits a first object in a second object is provided. The robot system includes a robot having a movable unit including a robot arm and an end effector provided in the robot arm and gripping the first object and a force detection unit detecting a force applied to the movable unit, and a control unit controlling the robot. The control unit executes (a) processing of moving the first object in a fitting direction and detecting a first position as a position where fitting of the first object and the second object is determined, (b) processing of moving the first object from the first position toward a determination direction different from the fitting direction and detecting a second position as a position where magnitude of a force applied to the first object reaches a predetermined reference value, and (c) processing of determining that a fitting condition of the first object and the second object is good when a predetermined determination condition including a condition that the second position is within an acceptable position range set according to the first position is satisfied.

DESCRIPTION OF EXEMPLARY EMBODIMENTS

A. First Embodiment

Figure 1:
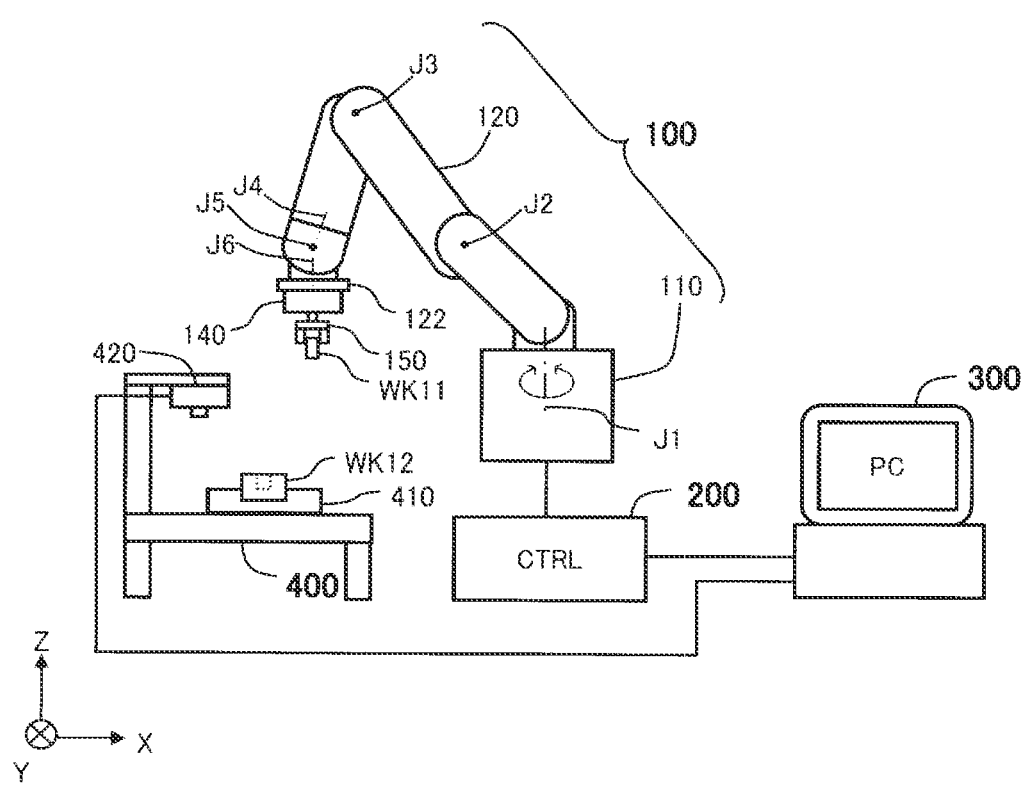
FIG. 1 is an explanatory diagram of a configuration example of a robot system in an embodiment.

FIG. 1 is an explanatory diagram showing an example of a robot system in one embodiment. The robot system includes a robot 100 that grips a first workpiece WK11, a control apparatus 200 that controls the robot 100, an information processing apparatus 300, and a platform 400 on which a second workpiece WK12 is mounted. The information processing apparatus 300 is e.g. a personal computer. In FIG. 1, three axes X, Y, Z defining an orthogonal coordinate system in a three-dimensional space are drawn. The X-axis and the Y-axis are axes in horizontal directions and the Z-axis is an axis in vertical directions.

A holder 410 holding the second workpiece WK12 is fixed to the platform 400. The robot 100 executes a fitting operation of gripping and fitting the first workpiece WK11 in the second workpiece WK12. The fitting operation will be further described later. A camera 420 that can capture an image of the second workpiece WK12 is placed on a support of the platform 400. The image captured by the camera 420 can be used for recognition of a position and a shape of the second workpiece WK12. Note that the camera 420 may be placed in another location or placed in the robot 100. Or, the camera 420 may be omitted.

The robot 100 includes a base 110 and an arm 120. The arm 120 is sequentially coupled by six joints. A force detection unit 140 and an end effector 150 are attached to an arm end 122 as a distal end portion of the arm 120. In the example of FIG. 1, the end effector 150 is a gripper that grips the first workpiece WK11. In the present disclosure, a mechanism having functions of the arm 120 and the end effector 150 is referred to as "movable unit".

The arm 120 is sequentially coupled by six joints J1 to J6. Of these joints J1 to J6, the three joints J2, J3, J5 are bending joints and the other three joints J1, J4, J6 are twisting joints. In the embodiment, a six-axis robot is exemplified, however, a robot including an arbitrary arm mechanism having one or more joints can be used. The robot 100 of the embodiment is a vertical articulated robot, however, a horizontal articulated robot may be used. Further, the present disclosure can be applied to another apparatus than the robot.

The force detection unit 140 is a six-axis force sensor that measures an external force applied to the movable unit of the robot 100. The force detection unit 140 has three detection axes orthogonal to one another in a sensor coordinate system as a unique coordinate system, and detects magnitude of forces parallel to the respective detection axes and magnitude of torque (moment of force) around the respective detection axes. The forces parallel to the respective detection axes are referred to as "translational forces". The torque around the respective detection axes is referred to as "rotational forces". In the present disclosure, the term "force" is used to include both the translational force and the rotational force. Further, in the present disclosure, the force applied to the movable unit of the robot 100 has the same meaning as a force applied to the first workpiece WK11.

The force detection unit 140 is not necessarily a sensor that detects the forces with respect to the six axes, but a sensor that detects forces in the smaller number of directions may be used. In place of the force detection unit 140 provided at the distal end of the arm 120, a force sensor as a force detection unit may be provided in one or more joints of the arm 120. Note that, it is only necessary that "force detection unit" has a function of detecting a force. That is, "force detection unit" may be a device that directly detects a force like a force sensor or a device that indirectly obtains a force like an IMU (Inertial Measurement Unit) or a device that detects a force from a current value of an actuator of the arm 120. Further, "force detection unit" may be externally attached to the robot 100 or provided inside of the robot 100.

Figure 2:
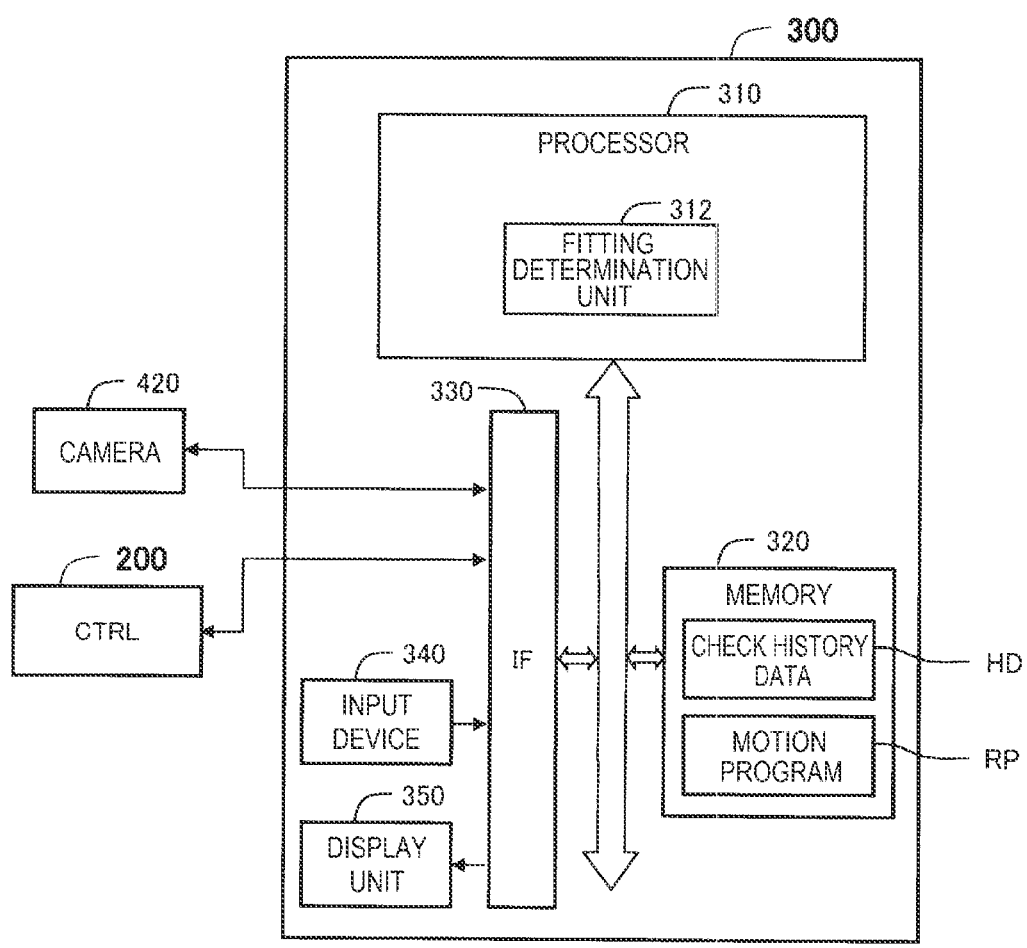
FIG. 2 is a functional block diagram of an information processing apparatus.

FIG. 2 is a block diagram showing functions of the information processing apparatus 300. The information processing apparatus 300 has a processor 310, a memory 320, an interface circuit 330, and an input device 340 and a display unit 350 coupled to the interface circuit 330. Further, the camera 420 and the control apparatus 200 are coupled to the interface circuit 330.

The processor 310 functions as a fitting determination unit 312 that executes the fitting operation of the workpieces and determination processing as to whether or not the operation is good. The function of the fitting determination unit 312 is realized by the processor 310 executing a computer program stored in the memory 320. Note that part or all of the functions of the fitting determination unit 312 may be realized by a hardware circuit.

In the memory 320, check history data HD representing a check history of the past and a motion program RP are stored. The check history refers to a history of the fitting operation and the determination as to whether or not the operation is good. An example of the check history data HD will be described later. The motion program RP includes a plurality of commands to move the robot 100. For example, the motion program RP is configured to control an operation of executing work to grip the first workpiece WK11 using the robot 100 and fitting the first workpiece WK11 in the second workpiece WK12.

In the present disclosure, the two workpieces as objects for fitting are also referred to as "first object" and "second object". In the first embodiment, the first workpiece WK11 corresponds to "first object" and the second workpiece WK12 corresponds to "second object". Further, the control apparatus 200 and the information processing apparatus 300 correspond to "control unit".

Figure 3:
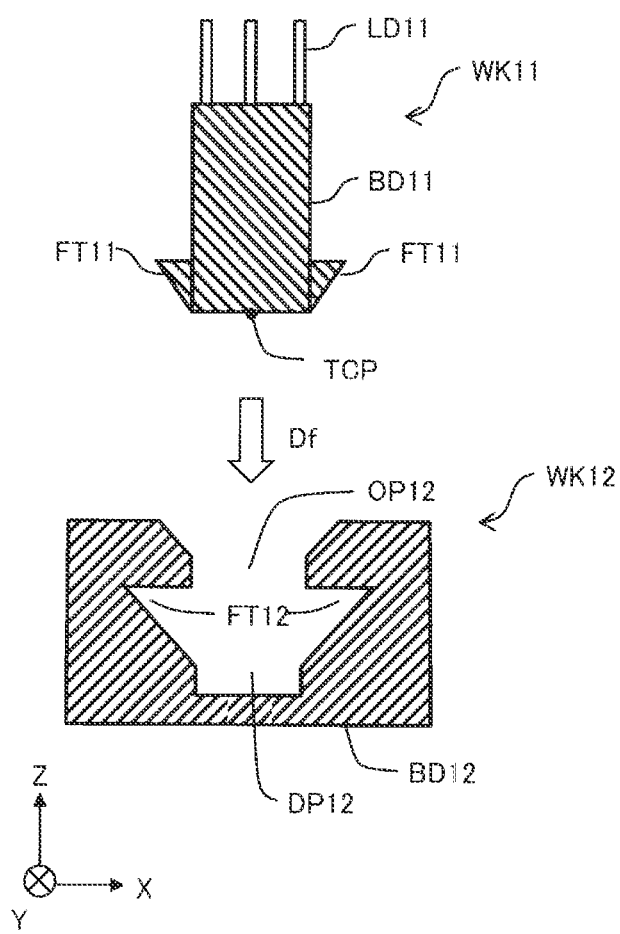
FIG. 3 is an explanatory diagram of objects used in a first embodiment.

FIG. 3 is an explanatory diagram of the first workpiece WK11 and the second workpiece WK12 used in the first embodiment. The two workpieces WK11, WK12 are objects formed mainly using resins and fitted by the so-called snap-fit. The first workpiece WK11 is the so-called male connector and has a main body BD11, a plurality of engagement projections FT11 provided on the outer circumference of the main body BD11, and a plurality of lead wires LD11. A plurality of contact points are provided on the outer surface of the main body BD11, however, the illustration thereof is omitted in FIG. 3. The second workpiece WK12 is the so-called female connector and has a main body BD12 and a recessed portion DP12 formed inside of the main body BD12. A plurality of contact points are provided on the inner surface of the recessed portion DP12, however, the illustration thereof is omitted in FIG. 3. In the recessed portion DP12, a plurality of concave portions FT12 engaging with the plurality of engagement projections FT11 of the first workpiece WK11 are provided. An opening portion OP12 of the recessed portion DP12 has an opening width smaller than the widths of the engagement projections FT11 to resist entry of the plurality of engagement projections FT11 of the first workpiece WK11 into the recessed portion DP12. Note that the shapes of these workpieces WK11, WK12 are examples and objects having any other shapes may be used.

A TCP (tool center point) of the robot 100 is set in the distal end part of the main body BD11 of the first workpiece WK11. The position of the arm 120 of the robot 100 is detected as a position of the TCP and the arm 120 is controlled using the position of the TCP. The TCP may be set to another position than that of the first workpiece WK11. Also, in this case, in a state in which the first workpiece WK11 is gripped by the end effector 150, a position change of the TCP and a position change of the first workpiece WK11 are the same. Therefore, the determination as to whether or not the fitting is good, which will be described later, may be performed with the position of the TCP as the position of the first workpiece WK11.

Figure 4:
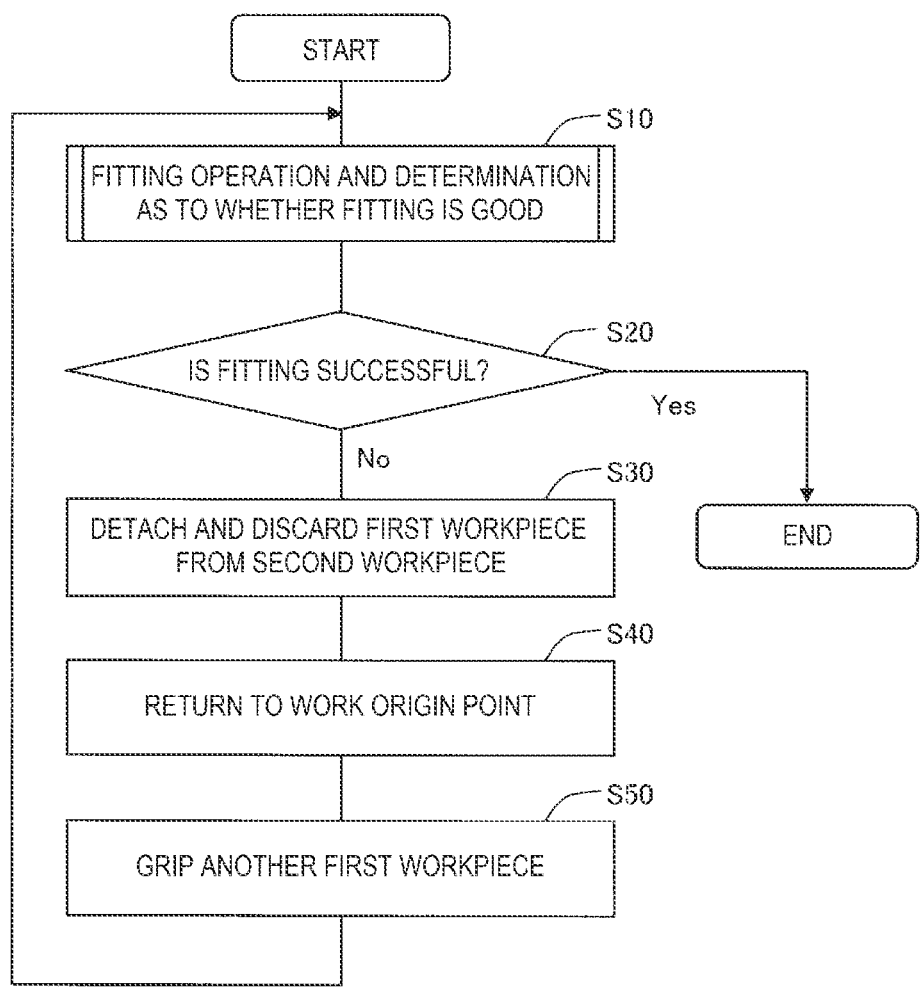
FIG. 4 is a flowchart showing a procedure of fitting processing in the embodiment.

FIG. 4 is a flowchart showing a procedure of the fitting processing in the embodiment. At step S10, the fitting determination unit 312 executes the fitting operation and the determination as to whether or not the fitting is good. The details of the procedure at step S10 will be described later. At step S20, when the fitting is good, the processing is ended and, when the fitting is not good, the processing goes to step S30. At step S30, the fitting determination unit 312 controls the robot 100 to detach and discard the first workpiece WK11 from the second workpiece WK12. In this regard, the second workpiece WK12 may also be discarded. At step S40, the fitting determination unit 312 returns the robot 100 to a work origin point of the fitting operation. At step S50, the fitting determination unit 312 controls the robot 100 to grip another first workpiece WK11. Then, the processing returns to step S10 and the fitting operation and the determination as to whether or not the fitting is good are executed again. The processing in FIG. 4 is repeatedly executed, and thereby, the fitting work of the first workpiece WK11 and the second workpiece WK12 may be sequentially executed.

Figure 5:
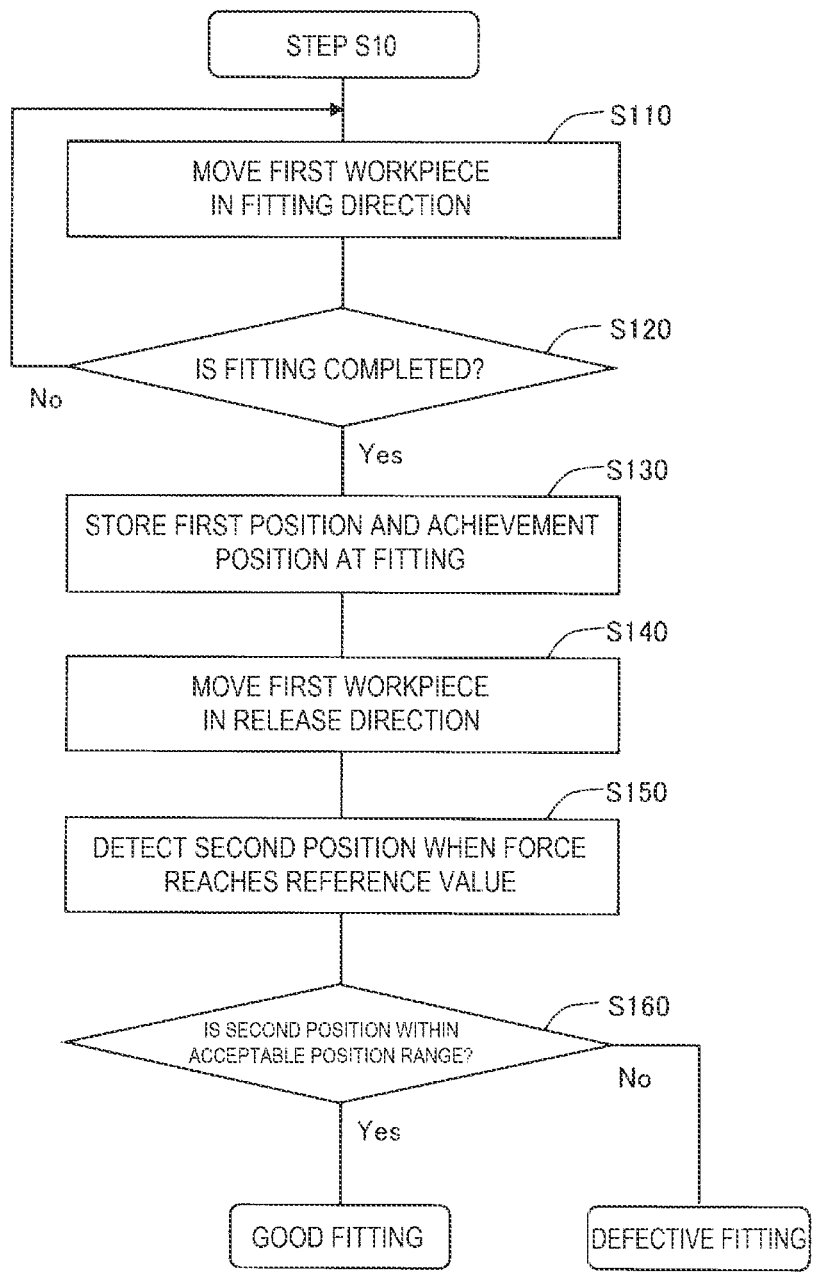
FIG. 5 is a flowchart showing a processing procedure at step S10 in the first embodiment.
Figure 6:
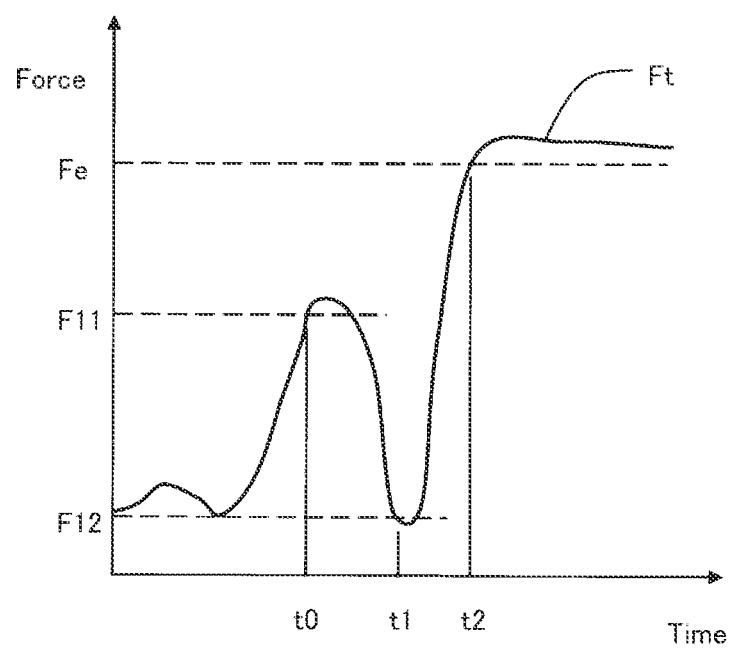
FIG. 6 is a timing chart showing a change over time of a force in a fitting operation of the first embodiment.
Figure 7:
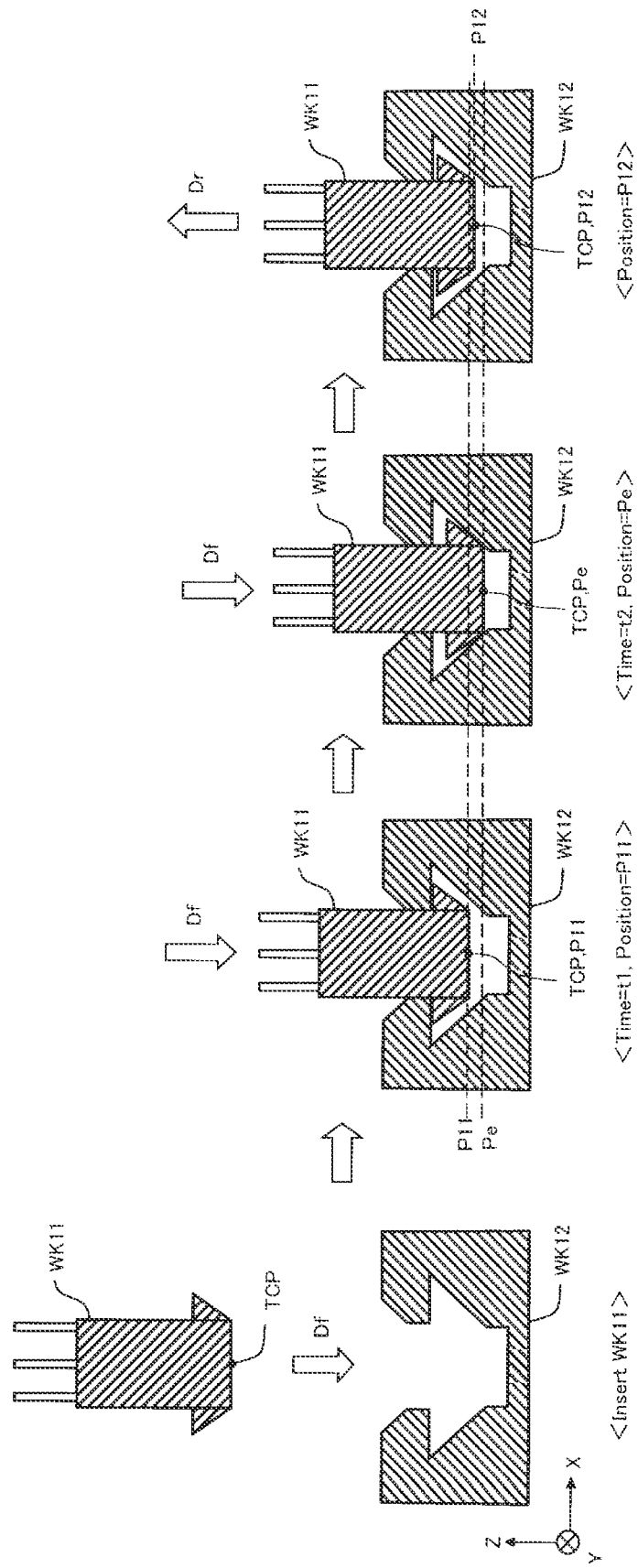
FIG. 7 is an explanatory diagram showing fitting and determination operations in the first embodiment.

FIG. 5 is a flowchart showing the processing procedure at step S10 in the first embodiment, FIG. 6 is a timing chart showing a change over time of a force applied to the movable unit of the robot 100 in the fitting operation, and FIG. 7 is an explanatory diagram showing the fitting and determination operations. In the present disclosure, the force applied to the movable unit of the robot 100 has the same meaning as the force applied to the first workpiece WK11.

At step S110, the first workpiece WK11 is moved in a fitting direction Df and fitted in the second workpiece WK12. This motion is continued until completion of the fitting is determined at step S120. As shown in FIG. 6, as the first workpiece WK11 is inserted into the second workpiece WK12, magnitude of a force Ft applied to the first workpiece WK11 temporarily increases and exceeds a first threshold F11 at time t0, and then, the force Ft decreases and lowers to be equal to or smaller than a second threshold F12 smaller than the first threshold F11 at time t1. Then, the first workpiece WK11 is further inserted and, when the magnitude of the force Ft reaches an achievement threshold Fe, the completion of the fitting at step S110 is determined. Note that the thresholds F11, F12, Fe are set in advance.

As shown in FIG. 7, a position P11 of the TCP of the robot 100 when the magnitude of the force Ft is below the second threshold F12 at time t1 is reported as "first position P11" of the first workpiece WK11 from the control apparatus 200 of the robot 100 to the fitting determination unit 312. The first position P11 is a position where fitting of the two workpieces WK11, WK12 is determined. Further, a position Pe where the magnitude of the force Ft is equal to or larger than the achievement threshold Fe at time t2 is reported as "achievement position Pe" of the first workpiece WK11 from the control apparatus 200 of the robot 100 to the fitting determination unit 312. When the first workpiece WK11 reaches the achievement position Pe, completion of the fitting is determined. At step S130 in FIG. 5, the fitting determination unit 312 stores the first position P11 and the achievement position Pe.

At step S140, the fitting determination unit 312 moves the first workpiece WK11 in a release direction Dr as shown in the right end part in FIG. 7 and, at step S150, detects a position P12 of the TCP when the magnitude of the force applied to the first workpiece WK11 reaches a predetermined reference value. The release direction Dr is an opposite direction to the fitting direction Df. The reference value of the force is set in advance to a force weaker than the force necessary for releasing the first workpiece WK11 from the second workpiece WK12. The position P12 is stored as "second position P12" of the first workpiece WK11 by the fitting determination unit 312. In the first embodiment, the release direction Dr corresponds to "determination direction" used for determination as to whether or not the fitting is good.

At step S160, the fitting determination unit 312 determines whether or not the second position P12 is within an acceptable position range set according to the first position P11. In the first embodiment, the acceptable position range of the second position P12 is set as a range between the first position P11 and the achievement position Pe. In the example of FIG. 7, when the following expression (1) is satisfied in comparison among only Z-coordinate values of the three positions P11, Pe, P12, the second position P12 is determined as being within the acceptable position range and the fitting condition is determined as being good.

$$Pe < P12 \leq P11 \quad (1)$$

On the other hand, when the expression (1) is not satisfied, the second position P12 is determined as being not within the acceptable position range and the fitting condition is determined as being not good. Note that the determination as to whether or not the second position P12 is within the acceptable position range may be performed using absolute coordinate values of the positions P11, Pe, P12 or performed using relative coordinate values. As will be understood from the above described expression (1), the positions Pe, P11 on both ends of the acceptable position range do not coincide, and the acceptable position range is set as a range including not only one position but including a plurality of positions.

Note that, in the fitting determination at steps S140 to S160, another direction than the release direction Dr may be used as the determination direction. Also, in this case, the determination direction is set to a direction different from the fitting direction Df. Or, the fitting determination may be executed with respect to a plurality of determination directions. When a plurality of determination directions are used, it is preferable to determine that the fitting condition of the two workpieces is good when the second position P12 is within the acceptable position range in at least one direction of the plurality of determination directions. In this manner, the determination as to whether or not the fitting condition is good may be performed more accurately.

Determination conditions as to whether or not the fitting condition is good may include the following two conditions.

First condition: the second position P12 is within the acceptable position range set according to the first position P11; and Second condition: in the fitting operation at steps S110, S120, the change over time of the magnitude of the force applied to the first workpiece WK11 or the position of the first workpiece WK11 is within a predetermined acceptable range.

In this case, when both the first condition and the second condition are satisfied, the fitting condition is determined as being good and, when at least one of the first condition and the second condition is not satisfied, the fitting condition is determined as being not good. In this manner, the fitting condition is determined as being good when both the first condition and the second condition are satisfied, and thereby, the possibility of a false determination as to whether or not the fitting is good may be further reduced.

Figure 8:
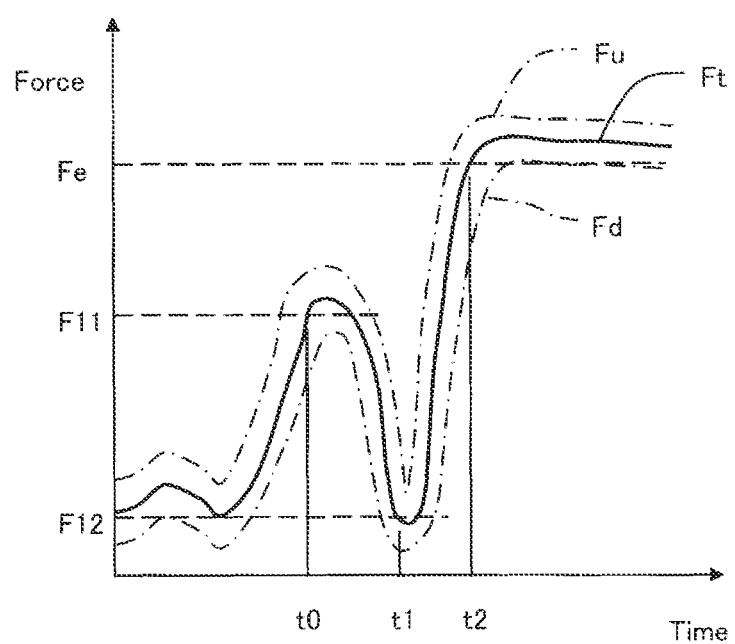
FIG. 8 is an explanatory diagram showing an acceptable range of a change over time of the force.

FIG. 8 is an explanatory diagram showing an acceptable range of the change over time of the force Ft applied to the first workpiece WK11. The change over time of the force Ft shown by a solid line is the same as that shown in FIG. 6. The fitting determination unit 312 stores the change over time of the magnitude of the force Ft applied to the first workpiece WK11 in the fitting operation and sets the acceptable range of the change over time. In FIG. 8, an upper limit curve Fu and a lower limit curve Fd showing the acceptable range of the change over time of the force Ft are set. When the change over time of the force Ft falls between these curves Fu, Fd, satisfaction of the above described second condition is determined. Note that, in place of the magnitude of the force Ft to the first workpiece WK11, the change over time of the position of the first workpiece WK11, i.e., the position of the TCP may be used. The change over time of the force or the change over time of the position of the TCP and the acceptable range thereof are stored in the memory 320 as the check history data HD.

Note that the acceptable range of the force Ft applied to the first workpiece WK11 or the change over time of the position of the first workpiece WK11 can be set based on at least one of the change over time when the fitting is determined as being good and the change over time when the fitting is determined as being not good, and preferably set based on both of the changes over time. The acceptable range of the change over time may be sequentially learned by machine learning and optimized.

As described above, in the first embodiment, when the determination condition including the first condition that the second position P12 when the first workpiece WK11 is moved toward the release direction Dr opposite to the fitting direction Df after fitting of the two workpieces WK11, WK12 is within the acceptable position range set according to the first position P11 is satisfied, the fitting condition is determined as being good. Therefore, the possibility of a false determination as to whether or not the fitting is good may be reduced.

B. Second Embodiment

Figure 9:
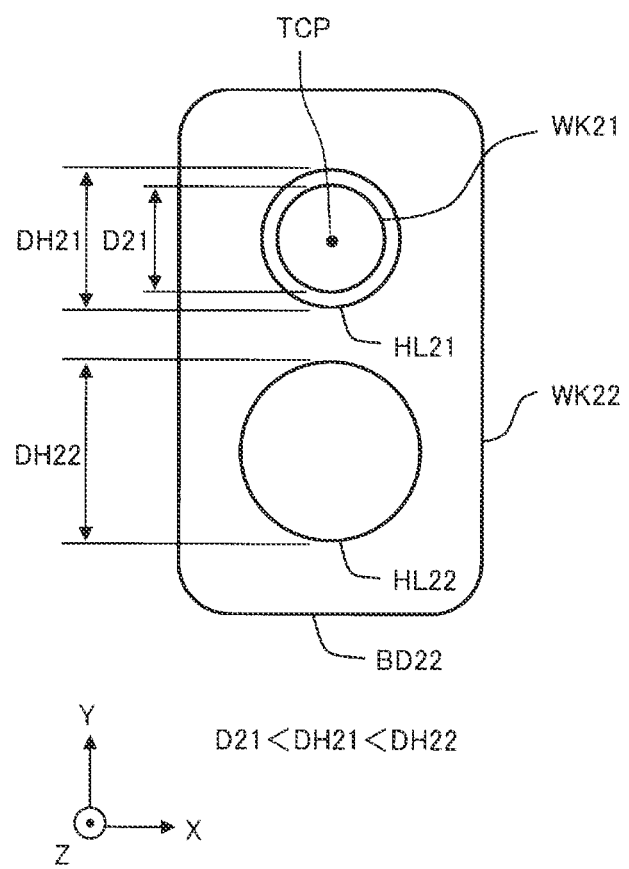
FIG. 9 is an explanatory diagram of objects used in a second embodiment.

FIG. 9 is an explanatory diagram showing two workpieces WK21, WK22 used in the second embodiment in a state in which the first workpiece WK21 is fitted in the second workpiece WK22. The first workpiece WK21 has a circular columnar outer shape with an outer diameter D21. The TCP of the robot 100 is set at the center of the bottom surface of the first workpiece WK21. The second workpiece WK22 has two cylindrical recessed portions HL21, HL22. The first recessed portion HL21 is formed to hold the first workpiece WK21, and an inner diameter DH21 of the first recessed portion HL21 is set to be a value larger than the outer diameter D21 of the first workpiece WK21. The second recessed portion HL22 is formed for another purpose, and an inner diameter DH22 of the second recessed portion HL22 is set to be larger than the inner diameter DH21 of the first recessed portion HL21. Here, the second recessed portion HL22 may be omitted. Note that, in the second embodiment, the fitting of the two workpieces WK21, WK22 is not snap-fit and a large resistance is not generated at fitting.

The configuration of the robot system in the second embodiment is the same as that shown in FIGS. 1 and 2. Further, the entire procedure of the fitting processing is the same as that shown in FIG. 3. The determination as to whether or not the fitting is good in the second embodiment is processing of determining whether or not the first workpiece WK21 is inserted into the first recessed portion HL21 of the second workpiece WK22.

Figure 10:
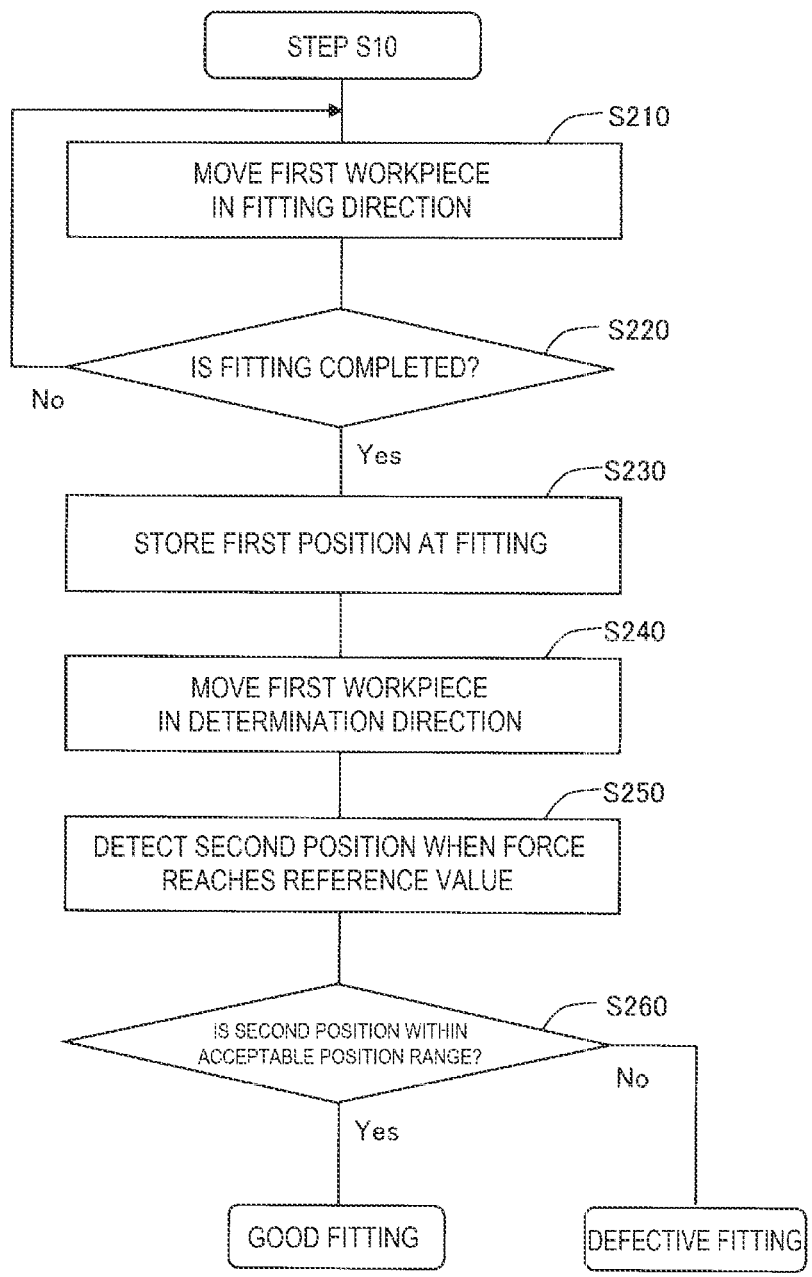
FIG. 10 is a flowchart showing a processing procedure at step S10 in the second embodiment.
Figure 11:
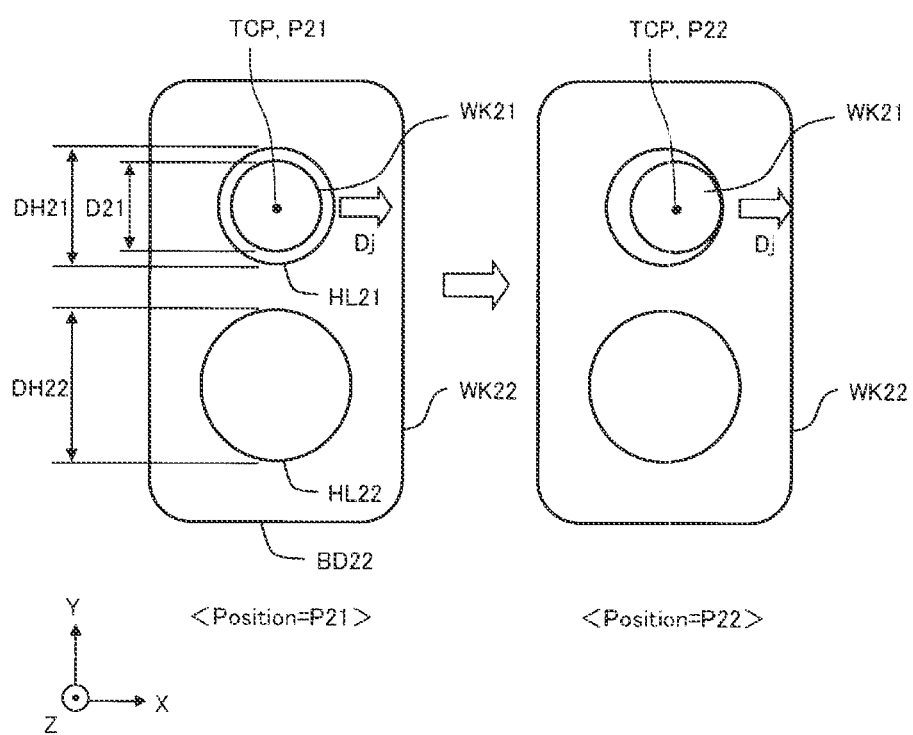
FIG. 11 is an explanatory diagram showing fitting and determination operations of in the second embodiment.

FIG. 10 is a flowchart showing a processing procedure at step S10 in FIG. 4 in the second embodiment, and FIG. 11 is an explanatory diagram showing fitting and determination operations in the second embodiment. Steps S210 to S260 in FIG. 10 substantially correspond to steps S110 to S160 in FIG. 5 of the first embodiment. Note that, in the second embodiment, the determination direction as a direction in which the first workpiece WK21 is moved for fitting determination is set to a direction different from the release direction Dr as the determination direction in the first embodiment.

At step S210, the first workpiece WK21 is moved in the fitting direction and fitted in the second workpiece WK22. This operation is continued until completion of the fitting is determined at step S220. Though not clearly shown in FIG. 11, the fitting direction is the −Z direction, i.e., the vertically downward direction. In the second embodiment, the completion of the fitting is determined when the force applied to the first workpiece WK21 is equal to or larger than a predetermined threshold. As shown in FIG. 11, a position P21 of the TCP of the robot 100 at the time is reported as "first position P21" of the first workpiece WK21 from the control apparatus 200 of the robot 100 to the fitting determination unit 312. At step S230 in FIG. 10, the fitting determination unit 312 stores the first position P21.

At step S240, the fitting determination unit 312 moves the first workpiece WK21 in a determination direction Dj as shown in FIG. 11 and, at step S250, detects a position P22 of the TCP when the magnitude of the force applied to the first workpiece WK21 reaches a predetermined reference value. The determination direction Dj can be set as an arbitrary direction different from the fitting direction Df. In the second embodiment, the determination direction Dj is the +X direction as the horizontal direction. The reference value of the force in this regard is set in advance as a force received by the first workpiece WK21 when the first workpiece contacts the inner surface of the first recessed portion HL21 of the second workpiece WK22. The position P22 at the time is stored as "second position P22" of the first workpiece WK21 by the fitting determination unit 312.

At step S260, the fitting determination unit 312 determines whether or not the second position P22 is within an acceptable position range set according to the first position P21. In the second embodiment, the acceptable position range of the second position P22 is set as a range in which an absolute value |P22−P21| of a difference between coordinate values of the first position P21 and coordinate values of the second position P22 is larger than zero and smaller than a difference (DH21−D22) between the inner diameter DH21 of the first recessed portion HL21 and the outer diameter D21 of the first workpiece WK21. For example, when the following expression (2) is satisfied in comparison between only X-coordinate values of the positions P21, P22, the second position P22 is determined as being within the acceptable position range and the fitting condition is determined as being good.

$$0<|P22-P21|<(DH21-D21) \quad (2)$$

Here, as the values of the DH21, D21, design values of the first workpiece WK21 and the second workpiece WK22 are used.

When the expression (2) is not satisfied, the second position P22 is determined as being not within the acceptable position range and the fitting condition is determined as being not good. Note that the determination as to whether or not the second position P22 is within the acceptable position range may be performed using absolute coordinate values of the positions P21, P22 or performed using relative coordinate values.

A certain level of deformation is produced in the workpieces WK21, WK22 and, when the acceptable position range of the second position P22 is determined, a shift, i.e., offset due to the deformation of the workpieces WK21, WK22 may be considered. Specifically, an offset component may be added to the term (DH21−D21) on the right side of the above described expression (2). In this case, the above described expression (2) may be extended to the following expression (3).

$$0<|P22-P21|<(DH21-D21+\alpha) \quad (3)$$

where α is a predetermined value equal to or larger than 0.

The acceptable position range of the second position P22 given by the expression (3) corresponds to the range set according to the first position P21.

Note that the fitting determination at steps S240 to S260 may be executed with respect to a plurality of determination directions. For example, whether or not the fitting is good may be performed when the determination direction Dj is set to the −X direction, or whether or not the fitting is good may be performed with respect to another determination direction than the +X direction or the −X direction. In the second embodiment, the determination direction Dj is preferably set to a direction orthogonal to the fitting direction, however, depending on the shapes of the workpieces, another direction than the direction orthogonal to the fitting direction or the release direction opposite to the fitting direction can be set as the determination direction Dj. Further, when the fitting determination is executed with respect to the second and subsequent determination directions, it is preferable that the coordinates of the first position P21 determined at the completion of the fitting are used without change as the coordinates of the first position P21, and only the coordinates of the second position P22 are changed. Whether or not the fitting is good is determined using the plurality of determination directions, and thereby, the determination can be performed more accurately.

When the plurality of determination directions are used, one of the following determination methods can be employed.

Determination method 1: the fitting condition is determined as being good when the second position P22 is within the acceptable position range in at least one determination direction;

Determination method 2: the fitting condition is determined as being good when the second position P22 is within the acceptable position range in all of the plurality of determination directions; and Determination method 3: the fitting condition is determined as being good when an average position of the second position P22 in the plurality of determination directions is within the acceptable position range.

When the determination method 1 or the determination method 2 is used, whether or not the second position is within the acceptable position range may be determined using the above described expression (3). On the other hand, when the determination method 3 is used, whether or not the second position is within the acceptable position range may be determined using the following expression.

$$0 < |P22ave - P21| < (DH21 - D21 + \alpha)/2 \quad (4)$$

where P22ave is average position coordinates of the second position P22 when the first workpiece WK21 is moved along a plurality of determination directions, and P21 is coordinates of the first position P21 determined at completion of the fitting. $(DH21-D21+\alpha)/2$ on the right side shows an upper limit of an amount of movement expected for the movement of the first workpiece WK21 in one determination direction.

In the determination as to whether or not the fitting is good in the second embodiment, the above described determination method 3 may be used. For example, when the state immediately after fitting is the state as shown in the right part of FIG. 11, the second position P22 does not change from the first position P21 and the above described expression (3) or expression (4) is not satisfied and the fitting condition may be determined as being not good. Accordingly, in this case, it is preferable to hold the final determination, and change the determination direction Dj to an opposite direction and determine whether or not the fitting is good again. In the second determination as to whether or not the fitting is good, when the second position P22 changes from the first position P21 and the above described expression (4) is satisfied, the fitting is determined as being good. On the other hand, in the second determination as to whether or not the fitting is good, when the second position P22 does not change from the first position P21 or when the second position P22 excessively largely changes, the above described expression (4) is not satisfied and the fitting condition is determined as being not good. In the actual application, it is preferable to determine which of the above described determination methods 1 to 3 to employ in advance in consideration of the shapes of the workpieces and the expressions of the determination conditions.

Further, in the second embodiment, like the first embodiment, the fitting may be determined as being good when both the following first condition and second condition are satisfied.

First condition: the second position P22 is within the acceptable position range set according to the first position P21; and Second condition: in the fitting operation at steps S210, S220, the change over time of the magnitude of the force applied to the first workpiece WK21 or the position of the first workpiece WK11 is within a predetermined acceptable range.

As described above, in the second embodiment, when the determination condition including the first condition that the second position P22 when the first workpiece WK21 is moved toward the determination direction Dj different from the fitting direction Df after fitting of the two workpieces WK21, WK22 is within the acceptable position range set according to the first position P21 is satisfied, the fitting condition is determined as being good. Therefore, the possibility of a false determination as to whether or not the fitting is good may be reduced.

Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined to solve part or all of the problems of the present disclosure or achieve part or all of the effects of the present disclosure. The technical features not described as essential features in this specification can be appropriately deleted.

(1) According to a first aspect of the present disclosure, a fitting method of fitting a first object in a second object using a robot having a movable unit including a robot arm and an end effector provided in the robot arm and gripping the first object and a force detection unit detecting a force applied to the movable unit is provided. The fitting method includes (a) moving the first object in a fitting direction and detecting a first position as a position where fitting of the first object and the second object is determined, (b) moving the first object from the first position toward a determination direction different from the fitting direction and detecting a second position as a position where magnitude of a force applied to the first object reaches a predetermined reference value, and (c) determining that a fitting condition of the first object and the second object is good when a predetermined determination condition including a condition that the second position is within an acceptable position range set according to the first position is satisfied.

According to the fitting method, when the determination condition including the determination condition that the second position when the first object is moved toward the determination direction different from the fitting direction is within the acceptable position range predetermined from the first position is satisfied, the fitting condition is determined as being good. Therefore, the possibility of a false determination as to whether or not the fitting is good may be reduced.

(2) In the fitting method, (a) may include further moving the first object along the fitting direction after the first object reaches the first position, and detecting an achievement position as a position where the magnitude of the force applied to the first object is equal to or larger than a predetermined achievement threshold, the determination direction may be a release direction as an opposite direction to the fitting direction, and the acceptable position range may be a range set between the first position and the achievement position.

According to the fitting method, whether or not the fitting condition is good may be determined according to whether or not the second position is within the acceptable position range between the first position and the achievement position.

(3) In the fitting method, the determination direction may include a plurality of directions, (b) may detect the second positions in the respective plurality of directions, and (c) may determine that the fitting condition of the first object and the second object is good when an average position of the second positions in the plurality of directions is within the acceptable position range.

According to the fitting method, the determination is performed with respect to the plurality of directions, and the determination as to whether or not the fitting condition is good may be performed more accurately.

(4) In the fitting method, the first position may be a position where, after the magnitude of the force applied to the first object exceeds a first threshold, the magnitude is below a second threshold smaller than the first threshold.

According to the fitting method, when the first object and the second object are snap-fitted, the first position may be properly determined.

(5) The fitting method further includes storing a change over time of the magnitude of the force applied to the first object or a position of the first object at (b) and setting an acceptable range of the change over time, wherein the determination condition includes a condition that the change over time of the magnitude of the force applied to the first object or the position of the first object at (b) is within the acceptable range.

According to the fitting method, the fitting condition is determined as being good when both a first condition that the second position is within the acceptable position range determined from the first position in advance and the second condition that the change over time of the magnitude of the force applied to the first object or the position thereof is within the acceptable range are satisfied, and thereby, the possibility of a false determination as to whether or not the fitting is good may be reduced.

(6) According to a second aspect of the present disclosure, a robot system that fits a first object in a second object is provided. The robot system includes a robot having a movable unit including a robot arm and an end effector provided in the robot arm and gripping the first object and a force detection unit detecting a force applied to the movable unit, and a control unit controlling the robot. The control unit executes (a) processing of moving the first object in a fitting direction and detecting a first position as a position where fitting of the first object and the second object is determined, (b) processing of moving the first object from the first position toward a determination direction different from the fitting direction and detecting a second position as a position where magnitude of a force applied to the first object reaches a predetermined reference value, and (c) processing of determining that a fitting condition of the first object and the second object is good when a predetermined determination condition including a condition that the second position is within an acceptable position range set according to the first position is satisfied.

According to the robot system, when the determination condition including the determination condition that the second position when the first object is moved in the determination direction different from the fitting direction is within the acceptable position range predetermined from the first position is satisfied, the fitting condition is determined as being good. Therefore, the possibility of a false determination as to whether or not the fitting is good may be reduced.

The present disclosure can be realized in other various aspects than those described as above. For example, the present disclosure may be realized in aspects of a robot system including a robot and a robot control apparatus, a computer program for realizing functions of the robot control apparatus, a non-transitory storage medium in which the computer program is recorded, etc.

What is claimed is:

1. A fitting method of fitting a first object in a second object using a robot having a movable unit including a robot arm and an end effector provided in the robot arm and gripping the first object and a force detection unit detecting a force applied to the movable unit, comprising:
   (a) moving the first object in a fitting direction and detecting a first position as a position where fitting of the first object and the second object is determined;
   (b) moving the first object from the first position toward a determination direction different from the fitting direction and detecting a second position as a position where magnitude of a force applied to the first object reaches a predetermined reference value; and
   (c) determining that a fitting condition of the first object and the second object is good when a predetermined determination condition including a condition that the second position is within an acceptable position range set according to the first position is satisfied.

2. The fitting method according to claim 1, wherein
   (a) includes further moving the first object along the fitting direction after the first object reaches the first position, and detecting an achievement position as a position where the magnitude of the force applied to the first object is equal to or larger than a predetermined achievement threshold,
   the determination direction is a release direction as an opposite direction to the fitting direction, and
   the acceptable position range is a range set between the first position and the achievement position.

3. The fitting method according to claim 1, wherein
   the determination direction includes a plurality of directions,
   (b) detects a plurality of second positions in the respective plurality of directions, and
   (c) determines that the fitting condition of the first object and the second object is good when an average position of the plurality of second positions in the plurality of directions is within the acceptable position range.

4. The fitting method according to claim 1, wherein
   the first position is a position where, after the magnitude of the force applied to the first object exceeds a first threshold, the magnitude is below a second threshold smaller than the first threshold.

5. The fitting method according to claim 1, further comprising storing a change over time of the magnitude of the force applied to the first object or a position of the first object at (b) and setting an acceptable range of the change over time, wherein the determination condition includes a condition that the change over time of the magnitude of the force applied to the first object or the position of the first object at (b) is within the acceptable range.

6. A robot system that fits a first object in a second object, comprising:

a robot having a movable unit including a robot arm and an end effector provided in the robot arm and gripping the first object and a force detection unit detecting a force applied to the movable unit; and a control unit controlling the robot, wherein the control unit executes (a) processing of moving the first object in a fitting direction and detecting a first position as a position where fitting of the first object and the second object is determined, (b) processing of moving the first object from the first position toward a determination direction different from the fitting direction and detecting a second position as a position where magnitude of a force applied to the first object reaches a predetermined reference value, and (c) processing of determining that a fitting condition of the first object and the second object is good when a predetermined determination condition including a condition that the second position is within an acceptable position range set according to the first position is satisfied.

* * * * *